(12) United States Patent
Moon

(10) Patent No.: US 8,358,500 B2
(45) Date of Patent: Jan. 22, 2013

(54) COMPUTER HAVING STANDBY POWER CUTOFF FUNCTION FOR PERIPHERAL DEVICE

(75) Inventor: Myung Moon, Anyang Si (KR)

(73) Assignee: Moneual Inc., Gasan-Dong, Geumcheon-gu, Seoul (KR)

( * ) Notice: Subject to any disclaimer, the term of this patent is extended or adjusted under 35 U.S.C. 154(b) by 262 days.

(21) Appl. No.: 12/911,855

(22) Filed: Oct. 26, 2010

(65) Prior Publication Data

US 2011/0157812 A1    Jun. 30, 2011

(51) Int. Cl.
*G06F 1/16* (2006.01)
(52) U.S. Cl. ............. 361/679.33; 307/38; 713/320; 248/634; 439/135; 312/270.3
(58) Field of Classification Search .......... 248/672, 248/316.2, 310, 636, 27.3, 634, 615, 201, 248/220.31, 221.11; 307/38; 360/97.19, 360/75, 256.2, 244.8, 923, 78.04, 98.08, 360/99.23, 133; 345/156, 588, 172, 76; 713/320; 439/540.1, 752, 853, 135; 312/223.3, 331.2, 312/244, 270.3, 45, 30, 333, 223.2; 361/679.02, 361/679.33, 679.34, 679.06, 679.46, 679.37, 361/679.39, 690, 792, 747, 728
See application file for complete search history.

(56) References Cited

U.S. PATENT DOCUMENTS

| | | | |
|---|---|---|---|
| 2008/0093928 A1* | 4/2008 | Hsieh | 307/38 |
| 2008/0218959 A1* | 9/2008 | Wu et al. | 361/685 |
| 2009/0282276 A1* | 11/2009 | Learmonth et al. | 713/320 |
| 2012/0087074 A1* | 4/2012 | Chen | 361/679.02 |

* cited by examiner

*Primary Examiner* — Hung Duong
(74) *Attorney, Agent, or Firm* — Robert E. Bushnell, Esq.

(57) ABSTRACT

The present invention relates to a computer having a standby power cutoff function for a peripheral device which can prevent a power loss by completely cutting off a standby current of a computer and a standby current of peripheral devices by cutting off a power supply to peripheral devices and a power supply unit when a computer is off. The power operation detection unit controls a power supply to the power supply unit by controlling the power cutoff switch unit by detecting an operation signal inputted from the power switch into the main board and for delaying and inputting an operation signal inputted from the power switch into the main board. The power loss due to a standby power can be prevented by cutting off a power supply to the computer and peripheral devices when a computer is off, with the help of a power cutoff switch unit which cuts off a power supply to the peripheral devices and the power supply by means of the power operation detection unit which detects an operation of the power switch.

6 Claims, 12 Drawing Sheets

FIG. 6

COMPUTER HAVING STANDBY POWER CUTOFF FUNCTION FOR PERIPHERAL DEVICE

CLAIM PRIORITY

The application makes reference to, incorporates the same herein, and claims all benefits accruing under 35 U.S.C. §119 from an application for COMPUTER HAVING STANDBY POWER CUTOFF FUNCTION FOR PERIPHERAL DEVICE EARLIER FILED IN THE Korean Intellectual Property Office on 24 Dec. 2009 and there duly assigned Serial No. 10-2009-0130935 and 22 Jun. 2010, serial No. 10-2010-0059326.

BACKGROUND OF THE INVENTION

1. Field of Invention

The present invention relates to a computer having a standby power cutoff function for a peripheral device, and in particular to a computer having a standby power cutoff function for a peripheral device which includes a power cutoff switch unit in a power supply unit and a peripheral device power socket unit in a power supply unit body, with a peripheral device electric outlet being connected with the peripheral device power socket unit, and a power operation detection unit is provided for controlling a power supply to a power supply unit by detecting an operation signal in a power switch and driving the power cutoff switch unit, so it is possible to prevent a power loss in such a manner that the standby currents of a computer and a peripheral device are completely cut off.

2. Description of the Related Art

Generally, a computer is equipped with a power supply unit for rectifying an externally supplied alternating current into a direct current.

The power supply unit is configured so that an alternating current power supplied can be always supplied to a coil formed in a closed circuit structure. So even when a power supply is cut off, a standby power is consumed.

Since the power supply unit needs a standby power, a certain apparatus for cutting off a power supply to a power supply unit when a computer is turned off, is being developed and used.

However, a conventional power saving apparatus, which is basically configured to cut off a power supply to a power supply unit and to save power as much as the loss of a standby power, is directed to cutting off only a power supply to a power supply unit of a computer, namely, a power supply to peripheral devices is not basically cut off. In the conventional art, a standby power loss problem occurs in peripheral devices.

SUMMARY OF THE INVENTION

Disclosure of the Invention

Accordingly, it is an object of the present invention to provide a computer having a standby power cutoff function for a peripheral device which overcomes the problems that a power loss occurs since a standby power is supplied to the peripheral devices connected with a computer because a conventional computer power saving device is basically designed to cut off only a power supply to a computer.

To achieve the above objects, there is provided a computer equipped with a power cutoff switch unit in a power supply unit, a peripheral device power socket unit in a power supply unit body, with a peripheral device electric outlet being connected with the peripheral device power socket unit, and a power operation detection unit for controlling a power supply to a power supply unit by detecting an operation signal in a power switch and driving the power cutoff switch unit.

Effects

In the present invention, it is possible to prevent a power loss, which might occur due to a standby power, by cutting off a power supply to a computer and peripheral devices when a computer is turned off with the help of a power cutoff switch unit which is designed to cut off a power supply to peripheral devices and a power supply unit and which operates by means of a power operation detection unit capable of detecting an operation of a power switch.

BRIEF DESCRIPTION OF THE DRAWINGS

The present invention will become better understood with reference to the accompanying drawings which are given only by way of illustration and thus are not limitative of the present invention, wherein;

FIG. 6 is a view illustrating a major block according to the present invention;

DETAILED DESCRIPTION OF THE INVENTION

Modes for Carrying Out the Invention

The preferred embodiments of the present invention will be described.

The present invention is basically directed to preventing an unnecessary power loss by minimizing a standby power to be used for a computer and peripheral devices.

Figure 1:
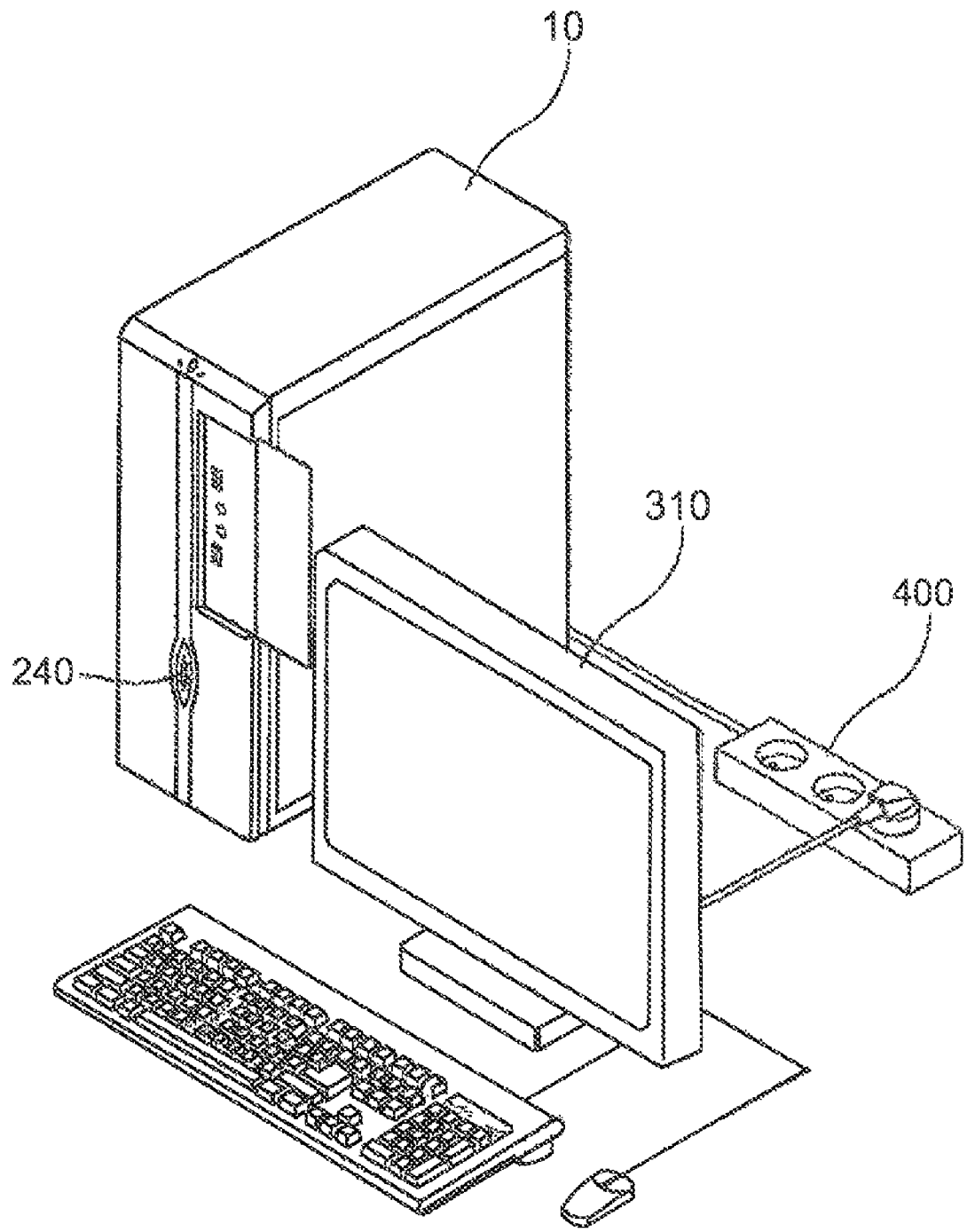
FIG. 1 is a perspective view illustrating an embodiment of the present invention.
Figure 2:
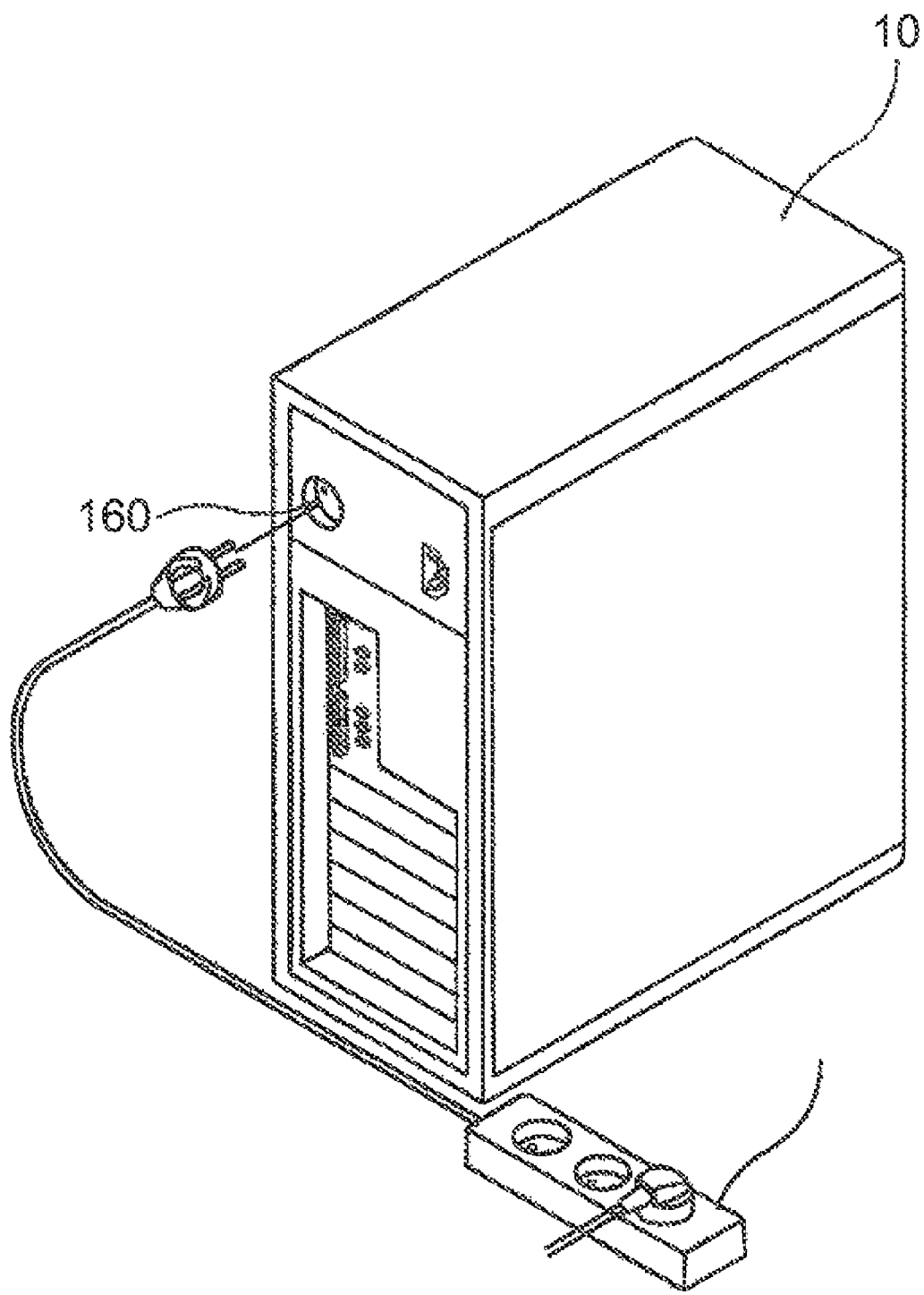
FIG. 2 is a backside perspective view illustrating an embodiment of the present invention.
Figure 3:
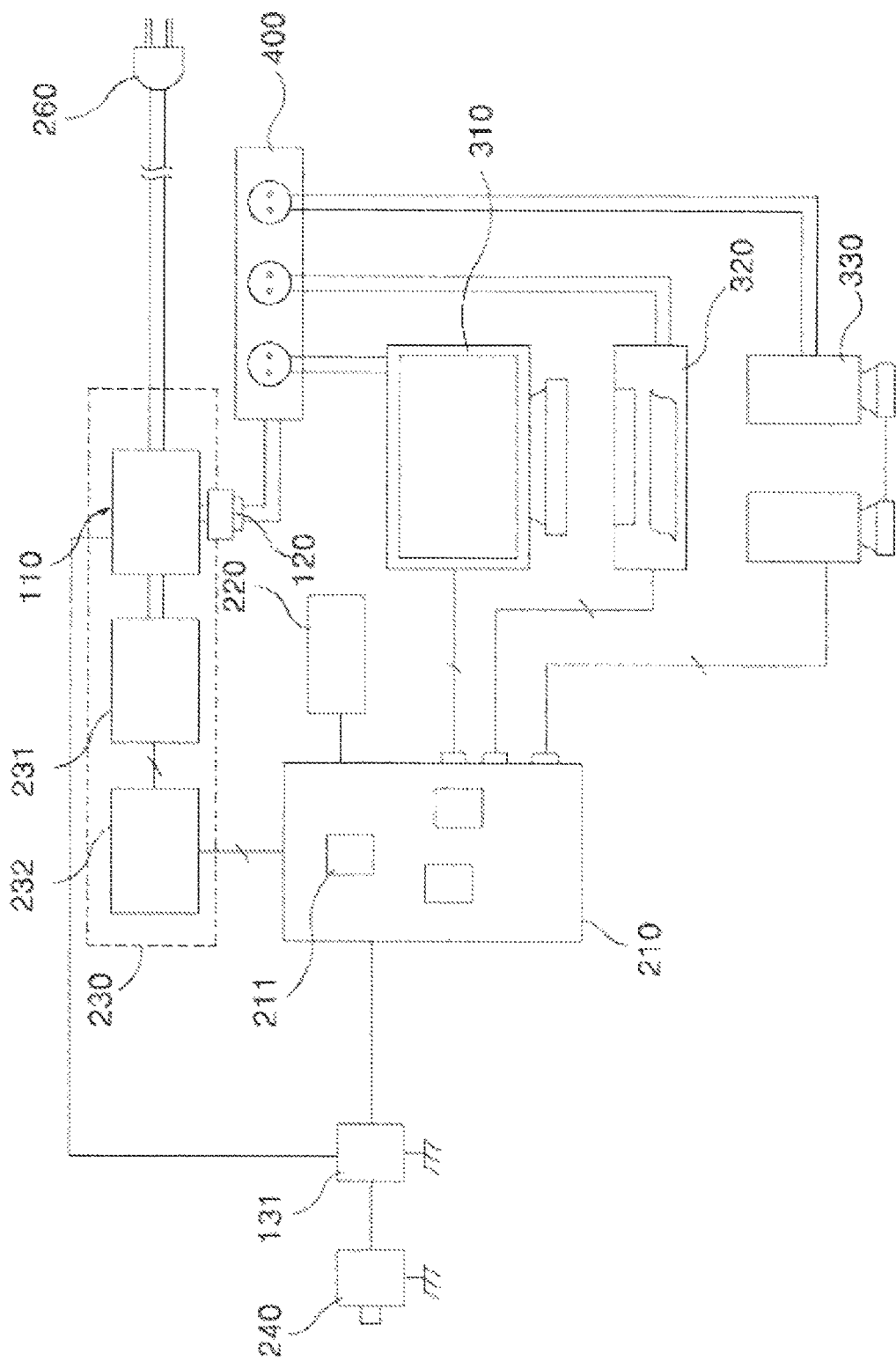
FIG. 3 is a view illustrating a major block according to the present invention.

As shown in FIGS. 1, 2 and 3, in a computer which includes a main board having a CPU (Central Processing Unit), a hard drive for storing an operation program and data, a power supply unit having a voltage transformation unit and a rectification unit for supplying power to the main board and the hard drive, a power switch for inputting on and to off operation signals into the main board, and a computer body which is formed in a box shape for mounting the main board, the hard drive and the power supply unit, there is provided a computer having a standby power cutoff function for a peripheral device which comprises a power cutoff switch unit which is provided in the power supply unit protruded from a backside of the computer body; a peripheral device power socket unit which is extended from the power cutoff switch unit for supplying power to the peripheral devices, with the peripheral device power socket unit being exposed from a backside of the computer body so that a plug of a peripheral device electric outlet can be inserted and connected with the peripheral device power socket unit for supplying power to the peripheral devices; and a power operation detection unit for controlling a power supply to the power supply unit by controlling the power cutoff switch unit by detecting an operation signal inputted from the power switch into the main board and for delaying and inputting an operation signal inputted from the power switch into the main board.

Figure 4:
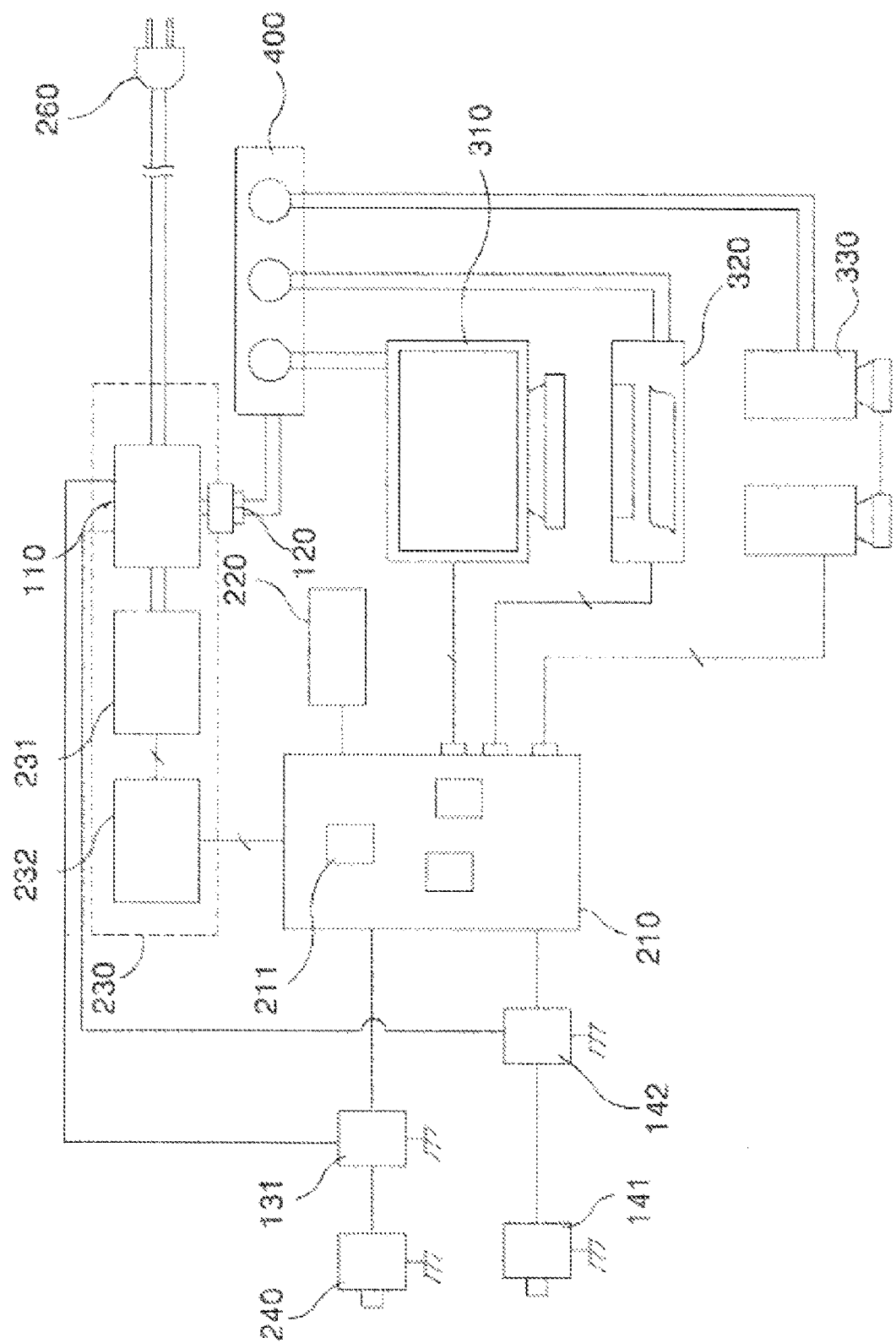
FIG. 4 is a view illustrating a major block which includes a power saving button according to another embodiment of the present invention.

In addition, as shown in FIG. 4, the computer body includes at its front side a power saving button for maintaining a power saving standby state in which the CPU 211, the hard drive and the main board can consume minimum operation power by inputting a power saving signal into the main board; and a power saving operation detection unit which is provided between the power saving button and the main board for cutting off a power supply to the peripheral device power socket unit in the power cutoff switch unit by detecting a power saving signal.

Figure 5:
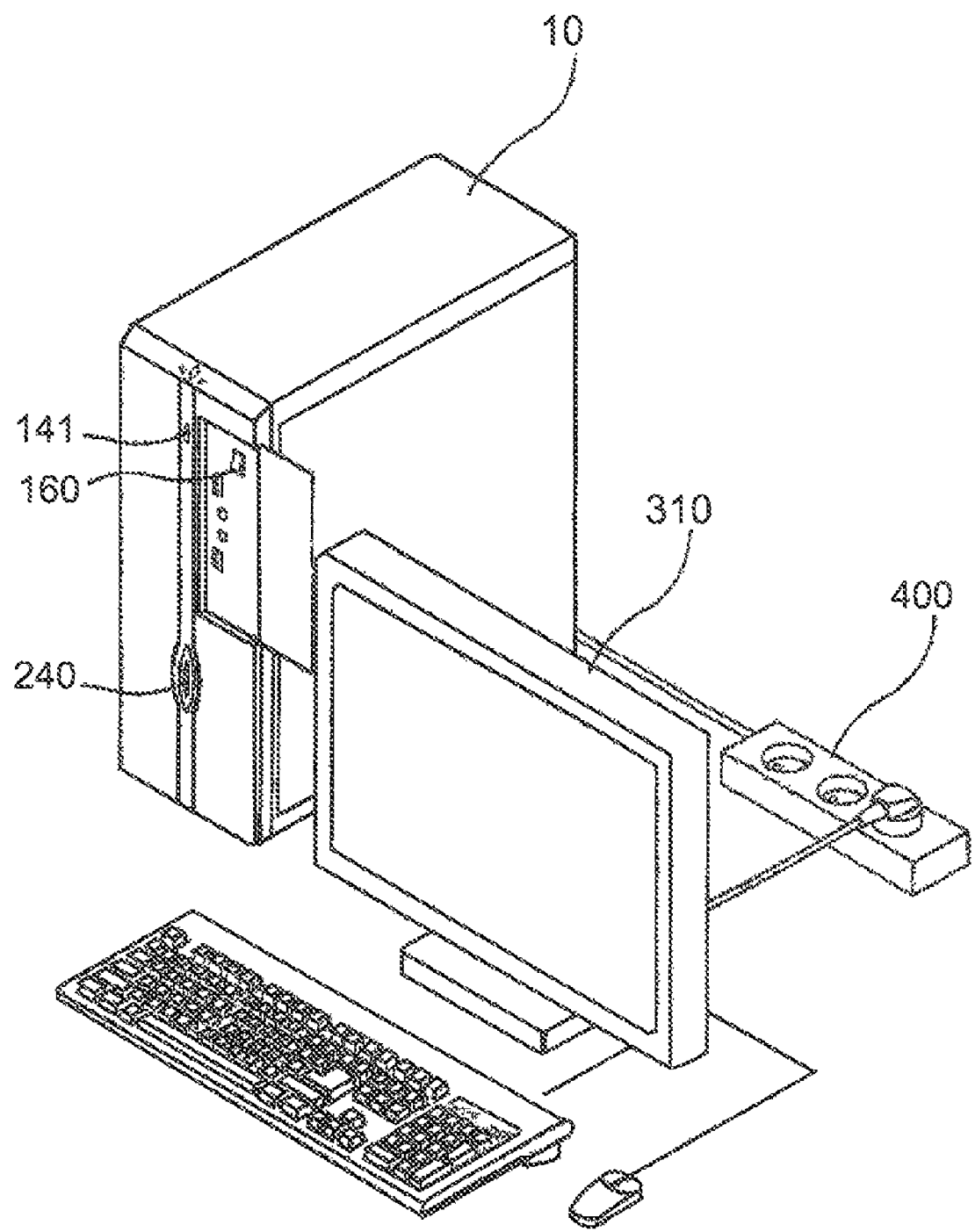
FIG. 5 is a perspective view illustrating a power supply switch in a front side of a computer body according to another embodiment of the present invention.
Figure 6:
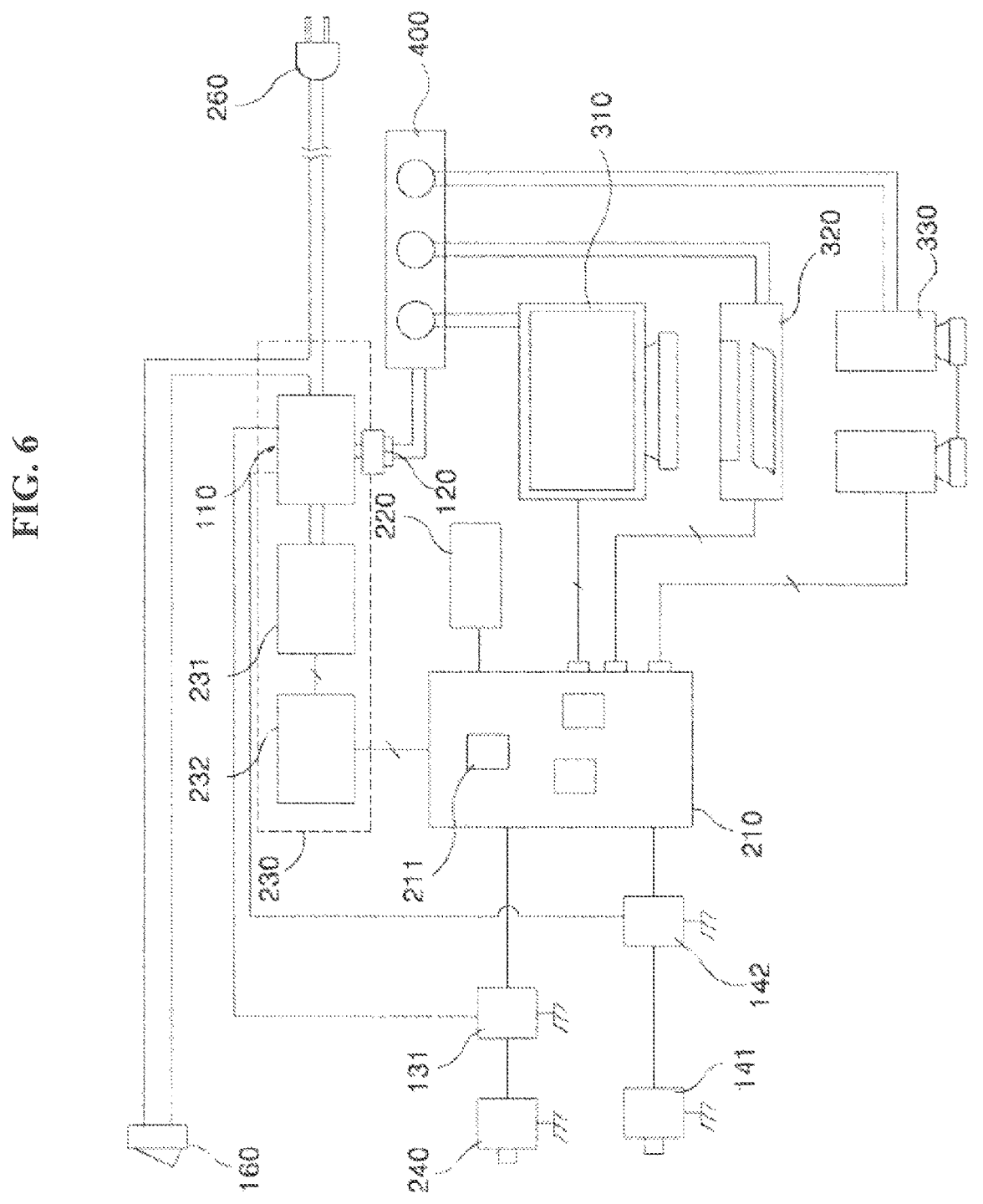

As shown in FIGS. 5 and 6, a power supply switch is provided at a front side to of the computer body for a user to easily cut off a power supply to the power supply unit. Since the power supply switch is generally provided at a backside of the computer body and a user cannot easily see and reach the power supply switch, it is not frequently used.

Figure 7:
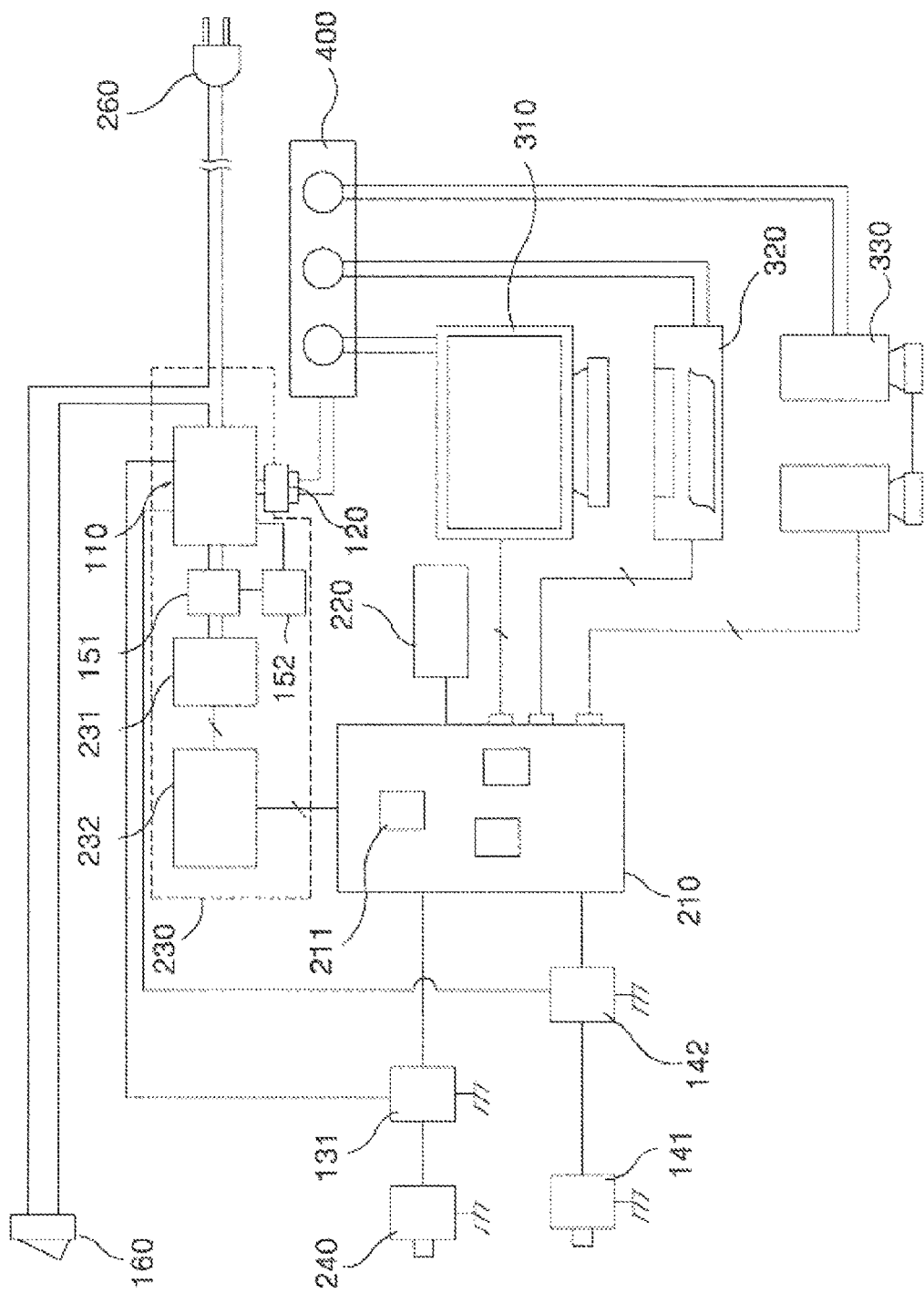
FIG. 7 is a view illustrating a major block which includes a power rate detection control unit according to another embodiment of the present invention.

In the embodiments of the present invention, as shown in FIG. 7, there are further provided a power rate detection unit for detecting a power rate consumption in the power supply unit; and a power rate detection control unit which allows the power switching control unit to maintain a state that power is supplied to the peripheral device power socket unit by inputting a computer operation signal into the power switching control unit of the power cutoff switch unit when the power rate detected by the power rate detection unit corresponds to a computer operation state, and which allows the power switching control unit to maintain a state that the power supply to the peripheral device power socket is cut off, by inputting a power saving operation signal into the power switching control unit of the power cutoff switch unit in case of the power saving operation state, and which allows the power switching control unit to cut off the power supply to the power supply unit and the peripheral device power socket unit by inputting a computer off signal into the power switching control unit of the power cutoff switch unit in case of the computer off state.

Figure 8:
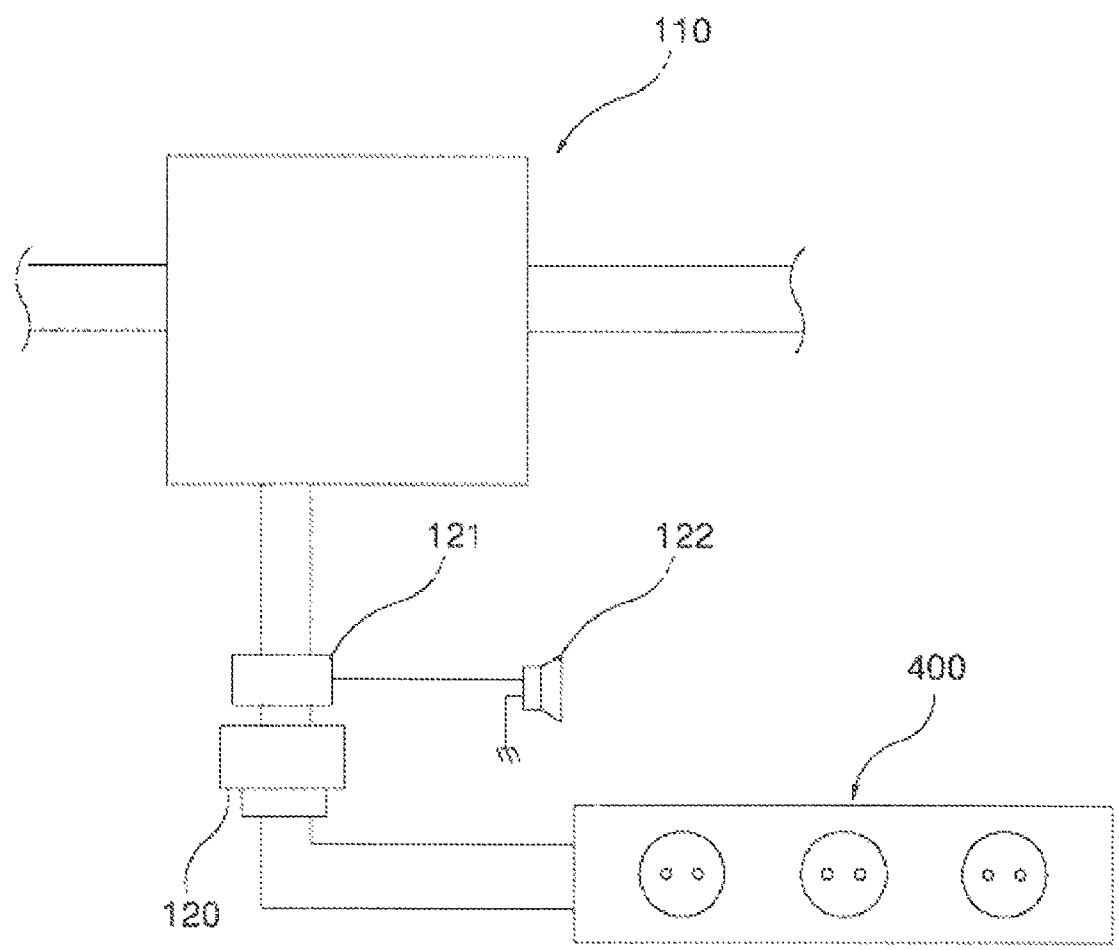
FIG. 8 is a view illustrating a major block which includes a power socket unit power rate detection unit according to another embodiment of the present invention.

As shown in FIG. 8, there are further provided a power socket unit power rate detection unit which outputs a permitted power rate excess signal in case of an abnormal state in permitted power rate by detecting the used power rate of the peripheral device power socket unit for a user to control the operation of the peripheral device by informing the user of a state that the used power rate of the peripheral device connected with the peripheral device electric outlet inserted into the peripheral device power socket unit exceeds permitted power rate; and a peripheral device power rate exceeding alarm unit which generates an alarm signal to a user for informing the user of a permitted power rate exceeding signal from the power socket unit power ate detection unit.

Figure 9:
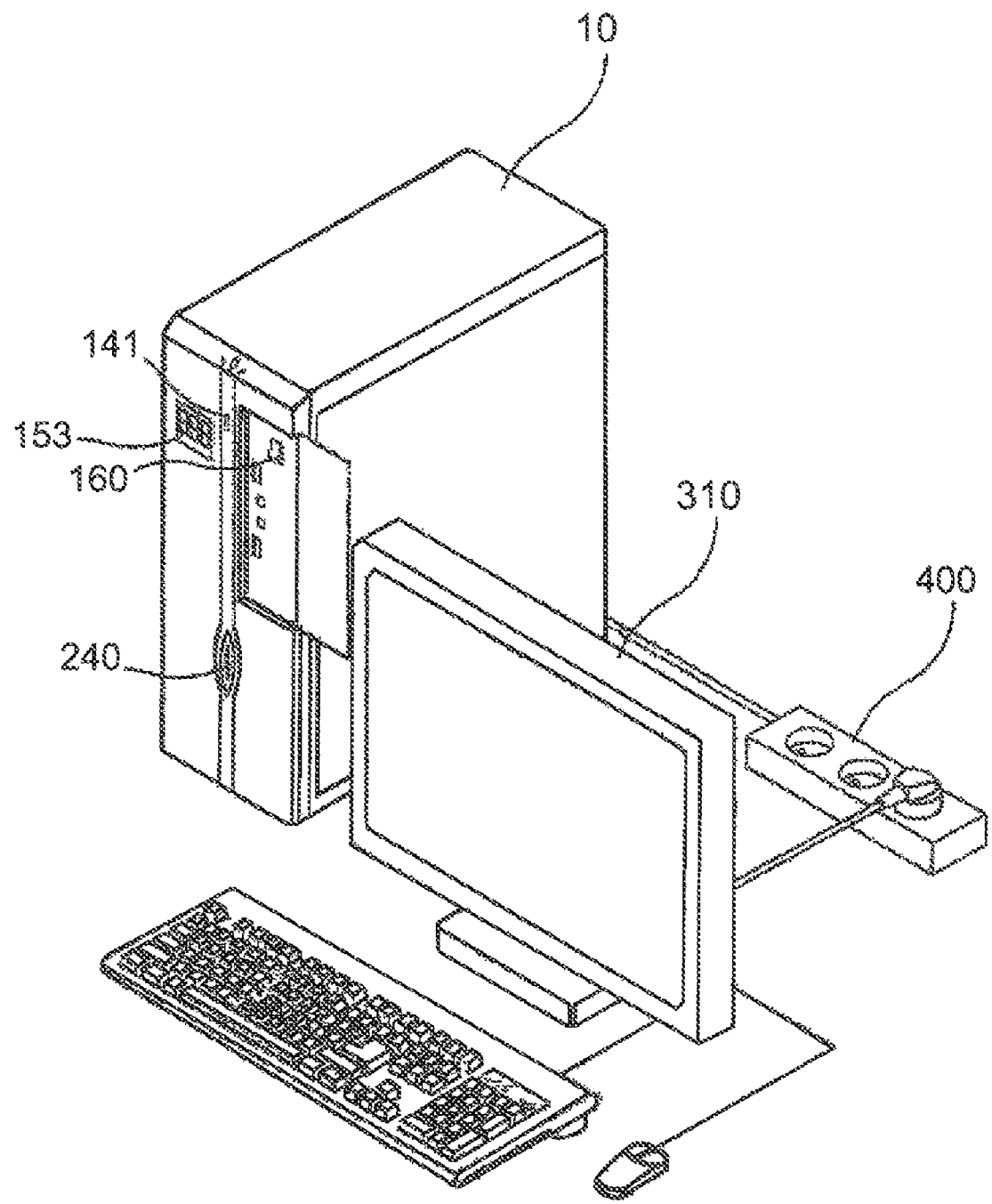
FIG. 9 is a perspective view illustrating a power rate display unit in a front side of a computer body according to another embodiment of the present invention.
Figure 10:
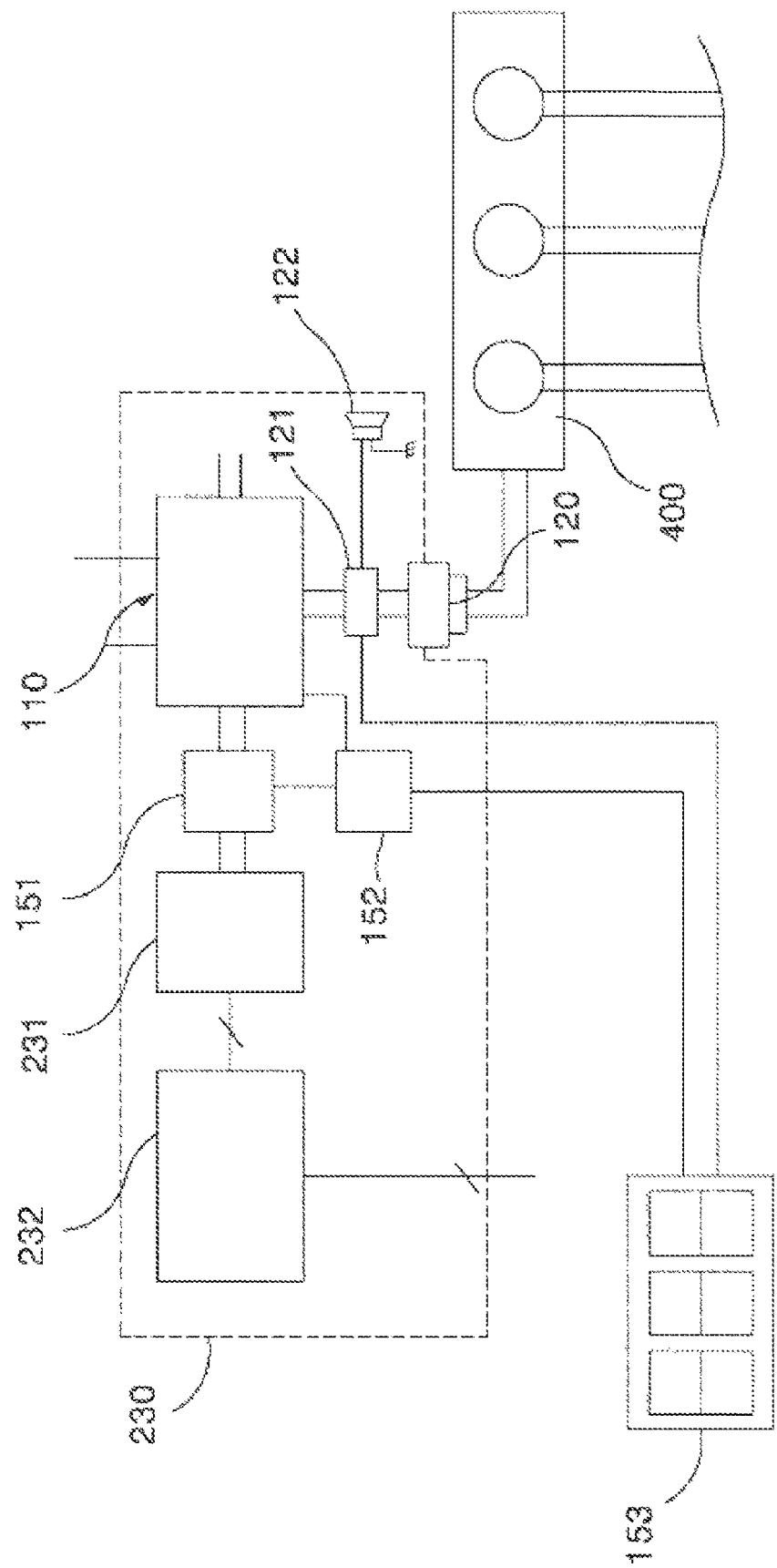
FIG. 10 is a view illustrating a major block of FIG. 9.

In the embodiment of the present invention, as shown in FIGS. 9 and 10, there are further provided a power rate detection control unit provided at a front side of the computer body for a user to visually check the used power rate of the computer; and a power rate display unit for displaying the used power rate of the computer body and the used power rate of the peripheral device with the help of the power socket unit power rate detection unit.

The power rate display unit is designed to selectively or periodically display the used power rate of the computer body and the used power rate of the peripheral devices separately in a certain sequence or is designed to selectively or periodically display the summed power rates.

Figure 11:
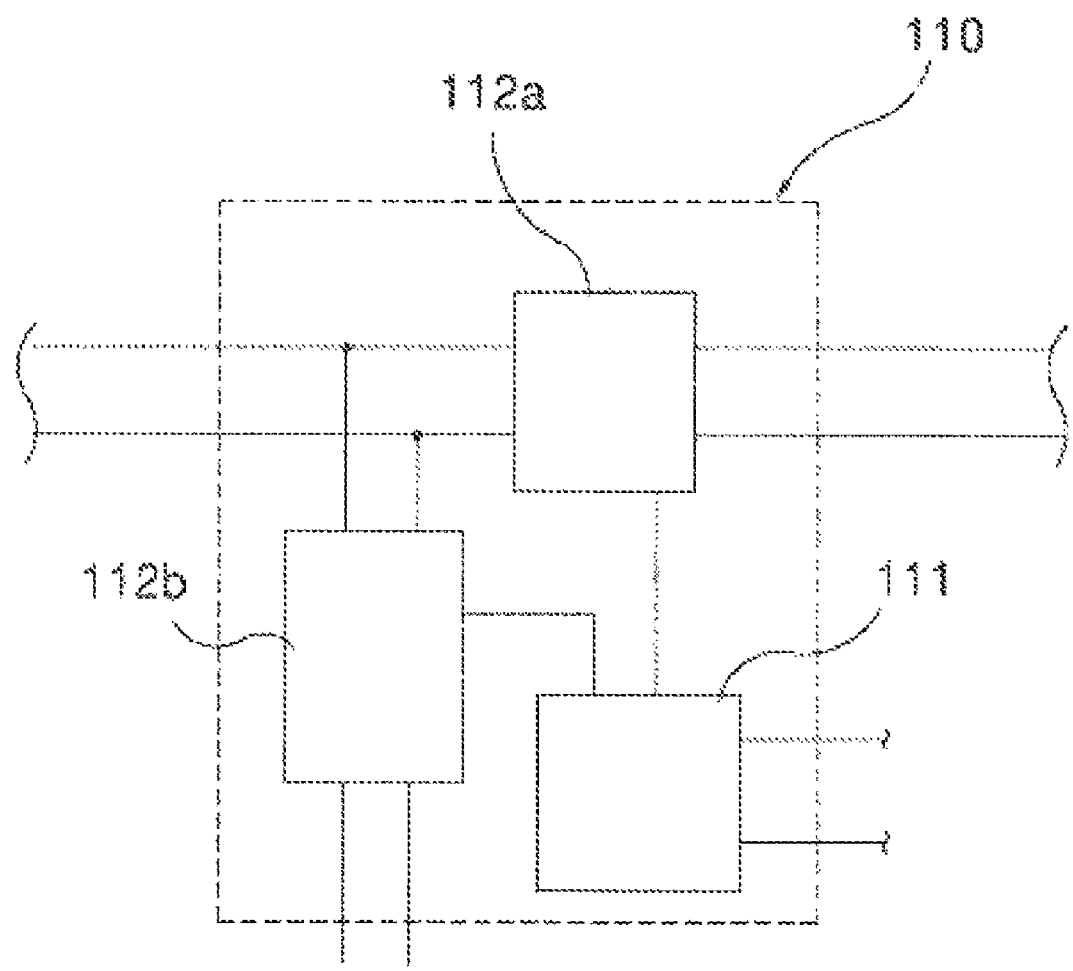
FIG. 11 is a view illustrating a major block which includes a power cutoff switch unit as one example according to the present invention.
Figure 12:
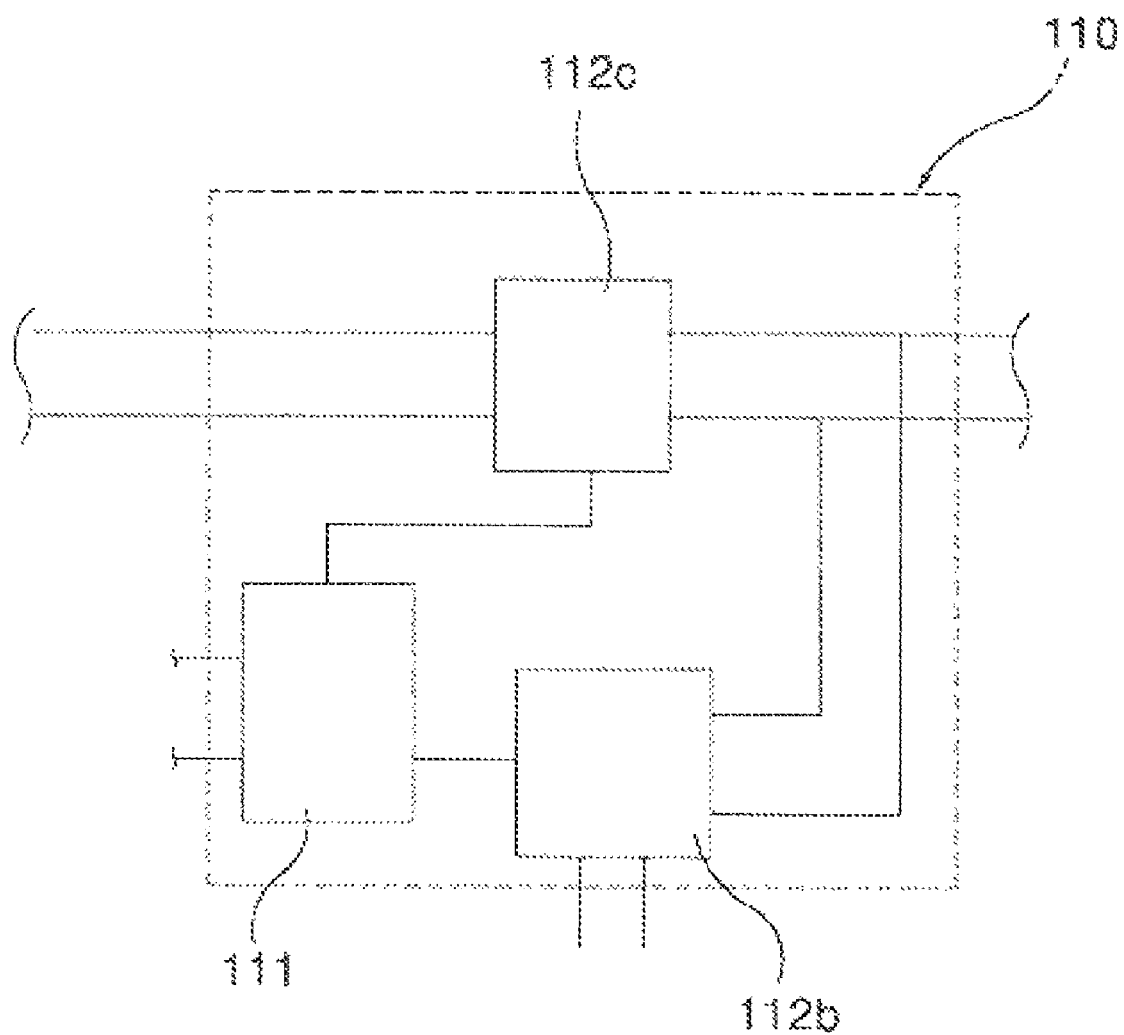
FIG. 12 is a view illustrating a major block which includes a power cutoff switch unit as another example according to the present invention.

As shown in FIGS. 11 and 12, the power cutoff switch unit includes a switching device unit for switching a power supply between the power supply unit and the peripheral device power socket unit, and a power switching control unit for controlling an operation of the switching device unit in accordance with a signal inputted from the power operation detection unit and the power saving operation detection unit.

The switching device unit includes either a construction, as shown in FIG. 11, formed of a main switching device for cutting power supplied via a power cable, and a peripheral device switch device for switching a power supply from the main switch device to the peripheral device power socket unit or a construction, as shown in FIG. 12, formed of a power supply switch device for switching a power supply to the power supply unit and a peripheral device switch device for switching a power supply to the peripheral device power socket unit.

The operations of the present invention will be described in details with reference to the accompanying drawings.

The computer having a standby power cutoff function for a peripheral device according to the present invention basically comprises a power cutoff switch unit which is provided in the power supply unit protruded from a backside of the computer body; a peripheral device power socket unit which is extended from the power cutoff switch unit for supplying power to the peripheral devices, with the peripheral device power socket unit being exposed from a backside of the computer body so that a plug of a peripheral device electric outlet can be inserted and connected with the peripheral device power socket unit for supplying power to the peripheral devices; and a power operation detection unit for controlling a power supply to the power supply unit by controlling the power cutoff switch unit by detecting an operation signal inputted from the power switch into the main board and for delaying and inputting an operation signal inputted from the power switch into the main boar. In the above construction of the present invention, when operating the computer equipped with the above elements, the power is not supplied to the peripheral devices such as a power supply unit, the monitor, a printer and a speaker before the computer is turned on, so the power is not consumed by the standby power of the computer and the peripheral devices.

When the power switch is turned on for operating the computer according to the present invention, the power operation detection unit of the power switch detects the operation of the power switch and inputs a signal corresponding to the operation of the power switch into the power switching control unit of the power cutoff switch unit, and the power switching control unit controls the switching device unit for thereby supplying power to the power supply unit. The supply of the power on signal to the main board is delayed in accordance with a control of the power switching control unit until the power is supplied to the power supply unit, so the computer is turned on.

When the user operates the power saving button, the power saving operation detection unit detects a power saving signal in accordance with an operation of the user's power saving button and inputs a power saving signal into the power switching control unit of the power cutoff switch unit, and the power switching control unit controls a switching device, so the power supply to the power socket unit connected with the peripheral devices is cut off, whereby it is possible to cut off the unnecessary power supply to the peripheral devices.

In another embodiment of the present invention, the power supply switch can be provided at a front side of the computer body. When the computer is not used, the power supply to the computer can be completely cut off in such a manner that the user turns off the power switch provided at a front side of the computer body.

In another embodiment of the present invention, the power rate detection unit can be provided between the power cutoff switch unit and the power supply unit. When the consumption of the power supplied to the power supply unit corresponds to the power consumption of the peripheral device standby power state due to the turn off of the computer by means of a computer operating program, the power ate detection unit measures the power rate consumption and inputs into the power rate detection control unit. When the operation mode of the computer corresponds to a standby power rate state, when the computer is turned off, in accordance with the detected power rate, the power switch control unit controls the switching device unit for thereby cutting off the power supply to the power supply unit and the peripheral device power socket unit, so the peripheral device standby power can be completely cut off even when the computer is turned off due to the computer program.

When the computer is in the power saving state due to the computer program since the computer is not used for a certain time, the power rate detection control unit detects the state with the help of the power rate detection unit and inputs into the power switching control unit of the power cutoff switch unit, and the power switching control unit controls the switching device unit for thereby cutting off the power supply to the peripheral device electric outlet unit, so the unnecessary power supply to the peripheral devices can be completely cut off even when the computer is in the power saving state by means of the computer program.

In another embodiment of the present invention, the power rate display unit can be provided at a front side of the computer body, so the user can visually check the used power rate when using the computer which leads to preventing the power loss due to the unnecessary turn on of the computer.

As described above, it is possible to prevent a power loss due to the standby power in such a manner that the power supply to the computer and the peripheral devices is cut off, when the computer is turned off, by providing the power cutoff switch unit which is capable of cutting off the power supply to the peripheral devices and the power supply unit with the help of the power operation detection unit which is designed to detect the power consumption in accordance with an operation of the power switch.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a computer which includes a main board having a CPU (Central Processing Unit), a hard drive for storing an operation program and data, a power supply unit having a voltage transformation unit and a rectification unit for supplying power to the main board and the hard drive, a power switch for inputting on and off operation signals into the main board, and a computer body which is formed in a box shape for mounting the main board, the hard drive and the power supply unit, a computer having a standby power cutoff function for a peripheral device, comprising:
   a power cutoff switch unit which is provided in the power supply unit protruded from a backside of the computer body;
   a peripheral device power socket unit which is extended from the power cutoff switch unit for supplying power to the peripheral devices, with the peripheral device power socket unit being exposed from a backside of the computer body so that a plug of a peripheral device electric outlet can be inserted and connected with the peripheral device power socket unit for supplying power to the peripheral devices; and
   a power operation detection unit for controlling a power supply to the power supply unit by controlling the power cutoff switch unit by detecting an operation signal inputted from the power switch into the main board and for delaying and inputting an operation signal inputted from the power switch into the main board.

2. The computer of claim 1, wherein said computer body includes at its front side:
   a power saving button for maintaining a power saving standby state in which the CPU, the hard drive and the main board can consume minimum operation power by inputting a power saving signal into the main board;
   a power saving operation detection unit which is provided between the power saving button and the main board for cutting off a power supply to the peripheral device power socket unit in the power cutoff switch unit by detecting a power saving signal; and
   a power supply switch which is provided at a front side of the computer body for a user to easily cut off a power supply to the power supply unit.

3. The computer of claim 2, further comprising:
   a power rate detection unit for detecting a power rate consumption in the power supply unit; and
   a power rate detection control unit which allows the power switching control unit to maintain a state that power is supplied to the peripheral device power socket unit by inputting a computer operation signal into the power switching control unit of the power cutoff switch unit when the power rate detected by the power rate detection unit corresponds to a computer operation state, and which allows the power switching control unit to maintain a state that the power supply to the peripheral device power socket is cut off, by inputting a power saving operation signal into the power switching control unit of the power cutoff switch unit in case of the power saving operation state, and which allows the power switching control unit to cut off the power supply to the power supply unit and the peripheral device power socket unit by inputting a computer off signal into the power switching control unit of the power cutoff switch unit 110 in case of the computer off state.

4. The computer of claim 3, further comprising:

a power socket unit power rate detection unit which outputs a permitted power rate excess signal in case of an abnormal state in permitted power rate by detecting the used power rate of the peripheral device power socket unit for a user to control the operation of the peripheral device by informing the user of a state that the used power rate of the peripheral device connected with the peripheral device electric outlet inserted into the peripheral device power socket unit exceeds permitted power rate; and a peripheral device power rate exceeding alarm unit which generates an alarm signal to a user for informing the user of a permitted power rate exceeding signal from the power socket unit power rate detection unit.

5. The computer of claim 4, further comprising:

a power rate detection control unit provided at a front side of the computer body for a user to visually check the used power rate of the computer; and a power rate display unit for displaying the used power rate of the computer body and the used power rate of the peripheral device with the help of the power socket unit power rate detection unit.

6. The computer of claim 1, wherein said power cutoff switch unit includes a switching device unit for switching a power supply between the power supply unit and the peripheral device power socket unit, and a power switching control unit for controlling an operation of the switching device unit in accordance with a signal inputted from the power operation detection unit and the power saving operation detection unit, and said switching device unit includes either a construction formed of a main switching device for cutting power supplied via a power cable, and a peripheral device switch device for switching a power supply from the main switch device to the peripheral device power socket unit or a construction formed of a power supply switch device for switching a power supply to the power supply unit and a peripheral device switch device for switching a power supply to the peripheral device power socket unit.

* * * * *